United States Patent

Clark

[11] Patent Number: 5,968,310
[45] Date of Patent: Oct. 19, 1999

[54] CLOSABLE BAG AND METHOD APPARATUS FOR MAKING SAME

[75] Inventor: Donald Clark, Los Angeles, Calif.

[73] Assignee: James E. Brunton, Glendale, Calif.

[21] Appl. No.: 09/022,849

[22] Filed: Feb. 12, 1998

Related U.S. Application Data

[63] Continuation-in-part of application No. 08/577,778, Dec. 22, 1995, Pat. No. 5,766,399, which is a continuation-in-part of application No. 08/198,601, Feb. 2, 1994, abandoned.

[51] Int. Cl.⁶ .................................................. B65D 33/30
[52] U.S. Cl. ........................ 156/500; 156/519; 156/552; 156/578; 383/89; 383/95; 493/215; 493/927
[58] Field of Search .................................. 156/176, 178, 156/244.12, 264, 265, 297, 436, 500, 519, 543, 552, 578; 383/89, 95, 109, 116, 905; 493/211, 215, 345, 927

[56] References Cited

U.S. PATENT DOCUMENTS

| | | | |
|---|---|---|---|
| 2,995,174 | 8/1961 | Wang | 156/519 |
| 3,201,030 | 8/1965 | Pollack | 383/89 |
| 3,417,675 | 12/1968 | Ausnit | 156/176 |
| 4,936,817 | 6/1990 | Runge | 493/927 |

*Primary Examiner*—Michael W. Ball
*Assistant Examiner*—Michael A Tolin
*Attorney, Agent, or Firm*—James E. Brunton

[57] ABSTRACT

A method and apparatus for making continuous rolls of a thin laminate composite that is ideally suited for the large scale production of reclosable bags which can be used for sealably packaging a wide variety of articles, including food products. The bags of the invention, after being opened, can quickly and easily be closed by rolling the open end downwardly upon itself in a manner to sealably deform one or more inelastic, malleable metal filaments which are interconnected with at least one of the laminate side walls of the bag.

3 Claims, 3 Drawing Sheets

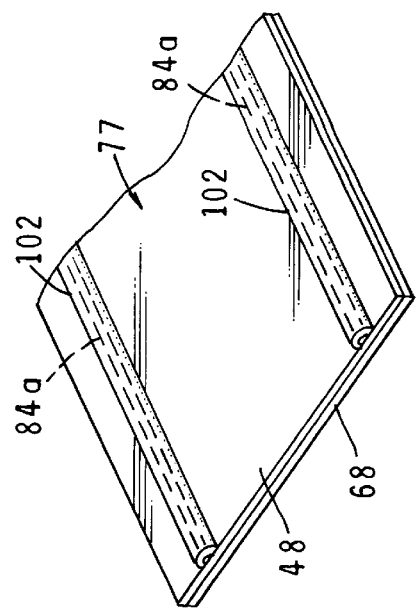
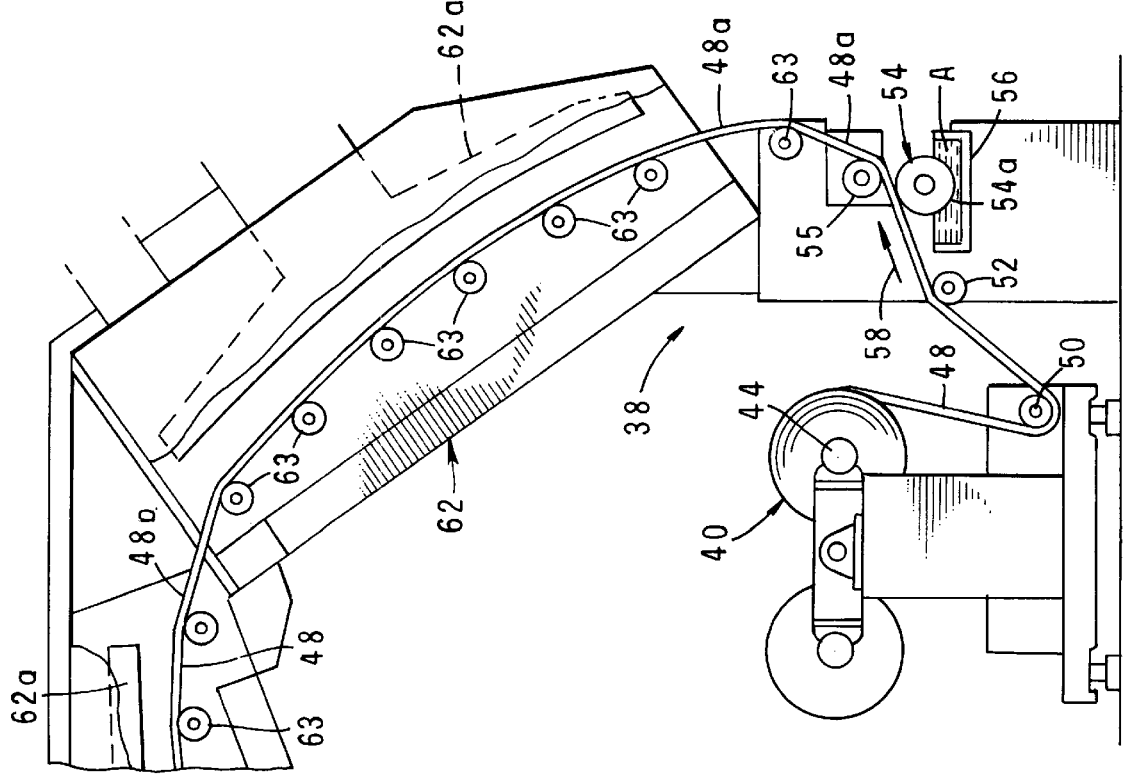

CLOSABLE BAG AND METHOD APPARATUS FOR MAKING SAME

This is a Continuation-In-Part application of application, Ser. No. 08/577,778 filed Dec. 22, 1995 which is a Continuation-In-Part application Ser. No. 08/198,601 filed Feb. 2, 1994, now abandoned.

BACKGROUND OF THE INVENTION

1. Field of the Invention

The present invention relates generally to closable bags. More particularly, the invention concerns the method and apparatus for making a laminate to which spaced apart, elongated, matable metal strips are interconnected. Following construction of the laminate it is folded to create a tubular like construction which is sealed at either end to form a reclosable bag for containing food products and other articles.

2. Discussion of the Invention

In recent years, plastic bags have become very popular for use in the food industry to contain various types of food products such as chips, crackers, cookies, candy, coffee and the like. Frequently the bags are constructed from thin transparent sheets of cellophane and like materials. When the bags are to be printed, a laminate construction is often used with the printing being done on the inner surface of one of the two laminates. With this construction, the printing is viewed from the exposed side of the printed laminate with the printing ink being disposed against the inner wall of the second laminate. In this way, the printing ink is protected from damage and is prevented from coming in contact with the food articles contained within the bag.

Access to the articles within the bag is obtained by tearing the seal formed at the top of the bag and reaching into the article containing inner chamber. However, because of the inherent nature of the cellophane like material from which the bag is constructed, the bag having once been opened cannot easily be closed. If the user attempts to roll the top of the bag to close the opening, the memory in the cellophane like material will cause the bag to unroll once more exposing the articles contained there within. Because the reclosing problem is so aggravating and so frustrating, a number of clip like closure devices have been devised to clamp the folded opening of the bag so as to maintain the bag in a closed configuration. These clips are typically large, cumbersome and difficult to use and, in some instances, are simply not available.

The thrust of the present invention is directed toward the solution of the annoying problem of how to easily and effectively close cellophane-like bags after they have been opened. As will become better understood from the discussion which follows, the present invention solves this problem in an elegant manner by affixing thin lengths of longitudinally extending malleable metal strips to a thin film composite which is used to make up the side walls of the bag. These mallable metal strips enable the upper portion of the bag to be conveniently rolled upon itself in a manner to securely seal the opening therein.

In the past, it has been suggested that lengths of malleable wire be taped, or otherwise affixed to the walls of paper bags to enable the top portion of the bag to be rolled downwardly to close the top opening in the bag. However, the significant costs and difficulties associates with the large scale production of such bags has prevented them from coming into wide use. Further, because the wires and the tape which secured them to the walls of the bag were exposed to the interior of the bag, sanitation problems strongly mitigated against the use of such bags in the packaging of food products. Exemplary of such prior art constructions are those disclosed in U.S. Pat. No. 907,492, issued to T. T. Graser, U.S. Pat. No. 1,903,839, issued to T. M. Royal; U.S. Pat. No. 4,267,768 issued to Cieslak; U.S. Pat. No. 3,402,052 issued to Walker; U.S. Pat. No. 3,537,636 issued to Rochette; and U.S. Pat. No. 3,201,030 issued to S. Pollack.

The articles of the present invention and the methods and apparatus for their manufacture uniquely overcome the drawbacks of the prior art by providing, for the first time, state of the art, laminate bags suitable for a variety of uses, including use in the food industry. The reclosable bags of the invention are easily reclosable without the use of clips or other mechanical devices. Additionally, the novel methods of the invention, make possible the very large scale production of such bags at costs only slightly greater than the costs of laminate bags presently in wide use. Additionally, because in one form of the invention, the malleable wire or metal strips which uniquely permit reclosure of the bag are encapsulated between the laminates which made up the side walls of the bags, the articles contained within the bags can never come into contact with the bendable strips, thereby completely obviating the possible sanitation problems which plagued the prior art devices.

Because the present invention constitutes an improvement to the invention disclosed in U.S. Ser. No. 08/577,778, this latter application Ser. No. 08/577,778 is hereby incorporated by reference as though fully set forth herein.

SUMMARY OF THE INVENTION

It is an object of the present invention to provide a reclosable plastic bag and the method and apparatus for making the same which can be used for sealably packaging a wide variety of articles, including food products. After the bag is opened, it can quickly and easily be closed by rolling the open end downwardly upon itself in a manner to deform inelastic, malleable metal strips which are interconnected with a side wall of the bag.

It is another object of the invention to provide a novel method and apparatus for making continuous rolls of a thin laminate material which is ideally suited for the large scale production of the reclosable bags. The laminate construction produced by the method of the invention comprises first and second thin layers of film to which one or more lengths of thin malleable metal strips or wires are uniquely affixed, such as by encapsulating the wires within beads of an elastomeric material which is deposited on one surface of the thin film composite.

Another object of the invention is to provide a method and apparatus of the character described in the preceding paragraph in which the laminate construction is such that it can readily be cut, folded, filled with product and then sealed at either end to form a completely sanitary, sealed package that can be easily reclosed after once having been opened.

Another object of the invention is to provide a method and apparatus of the class described which produces a composite material that can be used to construct reclosable bags of the character described which are of simple construction, are easy to use and one which can be manufactured in large volume at a very low cost.

DESCRIPTION OF THE DRAWINGS

FIGS. 1A and 1B when viewed together comprise a side elevational, diagrammatic view of one form of the apparatus of the invention for forming rolls of thin laminate composites which are made up of thin films to which mallable filaments are fixedly connected to form the composite laminate of the invention.

FIG. 3 is a generally perspective, fragmentary view of a portion of one form of the laminate composite produced by the apparatus illustrated in FIGS. 1A and 1B.

DESCRIPTION OF THE INVENTION

Figure 1A:
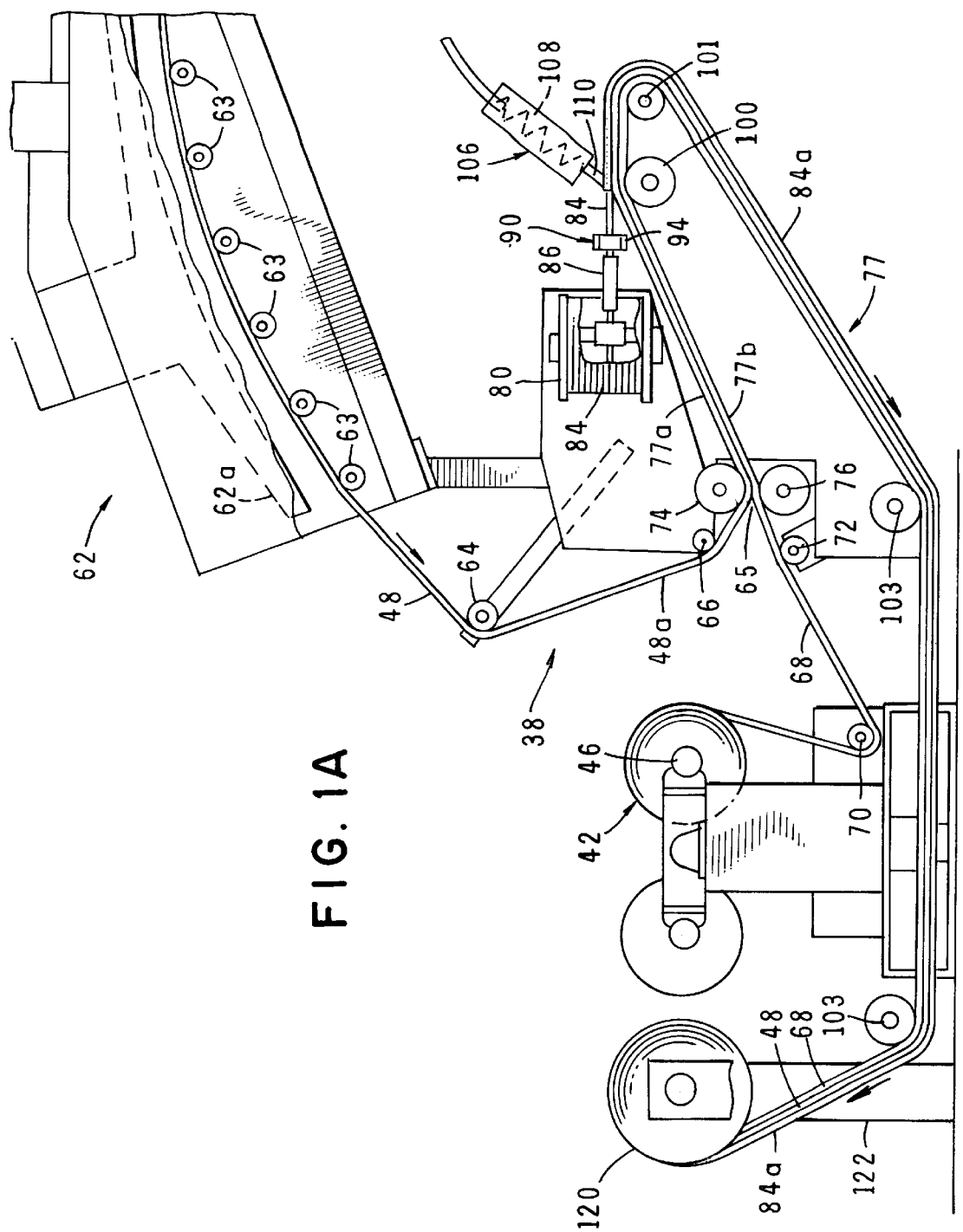

Referring to the drawings and particularly to FIGS. 1A and 1B, when these figure drawings are considered together, one form of the apparatus of the present invention for making continuous rolls of a laminate composite can be seen to comprise an elongated support frame 38 which supports the various operating components of the apparatus. The laminate composite which is produced by the apparatus of the invention and which is used to construct the reclosable containers of the invention is constructed from thin film materials which have been rolled on to first and second supply rolls 40 (FIG. 1B) and 42 (FIG. 1A). The films carried on the supply rolls can be of varying thickness, but preferably are on the order of between about 0.0003 inch and 0.005 inch.

Rolls 40 and 42 are suitably mounted on first and second support means shown here as rotatable rollers 44 (FIG. 1B) and 46 (FIG. 1A) respectively, which rollers are operably supported by the support frame 38. With the construction shown in the drawings, lengths of the thin film material can be easily unrolled from the rolls during the initial steps leading to the formation of the laminate composite. More particularly, the first thin film 48 (FIG. 1B), which is rolled on roll 40, is continuously removed therefrom by a first means which here includes idler rollers 50 and 52. Rollers 50 and 52 function to guide the travel of film 48 toward the adhesive applicator means of the invention which here comprises first and second rotatably mounted cooperating rollers 54 and 55 between which the thin film travels in the manner seen in FIG. 1B. Roller 54 includes a peripheral, adhesive pick-up surface 54a which continually rotates within a reservoir 56 that contains an appropriate liquid adhesive "A". During the thin film adhesive application step, the thin film 48, which is traveling in the direction of the arrow 58 of FIG. 1B, passes between rollers 54 and 55 in a manner such that a thin film of the adhesive "A" is uniformly spread over the lower surface 48a of the thin film. Rollers 54 and 55 as well as adhesive reservoir 56 are of a conventional construction well understood by those skilled in the art.

After passing through rollers 54 and 55, the adhesive coated film is drawn through drying means shown here as a large drying oven 62, which is superimposed over roll 40. Drying chamber 62, which is also of standard construction, is adapted to circulate air at elevated temperatures over the adhesive coated surface of the membrane or film 48 as the film passes over accurately spaced idler rollers 63 so as to partially cure the adhesive and render it slightly tacky for later bonding at a bonding location 65 with the second thin film which is being continuously removed from roll 42 (FIG. 1A). Either electric heating panels, ultra violet lamps or natural gas fired heaters of conventional construction can be used to heat the air that is circulated over the adhesive coated surface of the film as the film travels through the drying means. Once again, drying chamber 62 is of a character well known to those skilled in the film lamination art.

After the adhesive "A" is suitably cured, the adhesive coated membrane passes around idler rollers 64 and 66 (FIG. 1A) and travels toward the bonding location 65 where the first film 48 and the second film 68 are brought into engagement and are bonded together to form a first composite. As indicated in FIG. 1B, as film 48 moves progressively toward the bonding location, second thin film 68 is unrolled from roll 42 which is rotatably supported by second support means mounted on support frame 38. To unroll second film 68 from second roll 42, second means are provided on support frame 47 for controllably removing the film 68 from roll 42. After passing around idler rollers 70 and 72 (FIG. 1A), this second means functions to move second film 68 away from the second support means and urge it forwardly of the apparatus toward the bonding location 65 where it is brought into close proximity with the adhesive coated surface 48a of first thin film 48. At the bonding location, the bonding means of the invention, which here comprises a pair of rotatably mounted compression rollers 74 and 76, continuously urges the adhesive coated surface 48a of film 48 into pressural engagement with film 68 so as to securely bond the two films together to form the first composite 77 which has first and second or upper and lower surfaces 77a and 77b. Following formation of first composite 77, third means, which are also supported by support frame 38, function to continuously move the first composite away from the bonding location and forwardly of the apparatus in a direction toward the novel feed means of the invention, the character of which will presently be described. This third means here comprises rollers designated in the drawings by the numerals 100 and 101.

An extremely important aspect of the apparatus of the present invention is the previously mentioned feed means which functions to place at least one filament of an inelastic, malleable material on the upper or first surface 77a of composite 77. As best seen by referring to FIGS. 2 and 3, the inelastic, malleable material, here shown as a soft malleable wire 84, of between about 12 gauge and 32 gauge, is initially wound upon spaced apart reels 80 which are mounted on frame 38 on either side of feed means, here provided in the form of a pair of identically constructed electrically powered filament feeding rollers 82. Feeding rollers 82 function to controllably unwind the malleable wire 84 from reels 80 and then deposit it onto the first surface 77a of composite 77 via novel guide means, shown here as elongated guide tubes 86. Guide tubes 86, which are mounted intermediate reels 80, function to controllably guide the wire in a direction toward the laminate composite 77 in the manner shown in FIGS. 1A and 2. Tubes 86 are of relatively small diameter so as that the soft wire is constrained in a generally linear configuration as it travels toward the upper surface of laminate composite 77.

In one form of the method of the invention, the filaments, or wires 84 are connected to the first laminate composite by adhesively bonding then to the upper surface of the composite 77. To accomplish this step, fourth means, shown here as comprising filament adhesive applying means are provided. These means function to uniformly coat the filaments, or wires 84, with a suitable adhesive prior to the filaments being emplaced onto the upper surface of the composite 77. Experience has shown that by coating the wires with an appropriate adhesive, the wires will remain securely affixed to the laminate even after the laminate has been folded repeatedly. The filament adhesive applying means are here provided as a pair of adhesive applying units 90 each of which includes an adhesive containing chamber and oppositely disposed wire engaging applicators 94 which uniformly apply the adhesive to the wires as the wire travels toward composite 77. Applicators 94 can comprise rollers, or wick-like members, which draw the adhesive from the adhesive containing chamber and continuously apply it to the wires. Suitable adhesives for the bonding process are readily commercially available and are well known to those skilled in the art. Alternatively, applicators 94 can comprise spray units which function to spray a suitable adhesive onto the wires as they travel forwardly of the apparatus. Normally, wires 84 are continuously unwound from rolls 80 and fed through guide tubes 86 and toward the first surface 77a of laminate composite 77.

Referring once again to FIG. 1A, after the laminate composite 77 passes between rollers 74 and 76, it will travel upwardly and around roller 100. After passing around roller 100, where it receives adhesive coated wires 84a, the second composite thus formed will move under the bead applying means, which also comprises a part of the fourth means of the invention. The bead applying means portion of the fourth means for affixing the filaments to the first composite 77 functions to uniformly deposit over the adhesive coated filaments, or wires 84a, a bead of suitable encapsulation material, such as an elastomer, which is identified in FIG. 3 by the numeral 102. It is to be understood that for some applications, only the adhesive applied to the filaments by the filament adhesive applying means is relied upon to affix the filaments to composite 77. In other applications only the bead 102 is relied upon to affix the filament to the composite. In still other applications, both the adhesive and the bead are employed to affix the filaments to the composite.

Experience has shown that encapsulating the filaments within an appropriate yieldably deformable plastic material, either with or without previously coating them with adhesive will cause the filaments to remain securely in position on the selected surface of the laminate even after the laminate has been folded repeatedly. The bead applying means are here provided as a pair of assemblies 106 (FIG. 2) each of which includes a material containing chamber 108 and a bead applicating nozzle 110 which communicates with chamber 108 and functions to uniformly apply beads 102 over the filaments or wires as the wires travel along with the forward moving laminate composite. Assemblies 106 can comprise simple electrically heated devices which function to first melt hot-melt materials and then to deposit the material over the wires as they travel forwardly of the apparatus. It is to be understood that the construction of the assemblies 106 is governed largely by the type of material used to form beads 102 and may be heated or non-heated and may include pneumatic means for controllably forcing the material from the nozzles 110. While a number of flexible plastics and elastomers can be used to form beads 102, a product made by National Starch and Chemical and sold under product No. 34-4974 is satisfactory. This material comprises a low-running, pressure-sensitive hot melt made from a rubber base. Another product sold by this same company under product No. 34-2734 can also be used for certain applications. Various other materials, well known to those skilled in the art, can also be used to form beads 102.

Normally, wires 84 are continuously unwound from rolls 80 and fed through guide tubes 86 to form a construction of the character best seen in FIG. 3 wherein the wires 84 extend longitudinally of the upper surface of the laminate composite with the wires being secured in place by the adhesive, by hot melt or other yieldably deformable plastic material which forms beads 102 or by both mediums.

Figure 2:
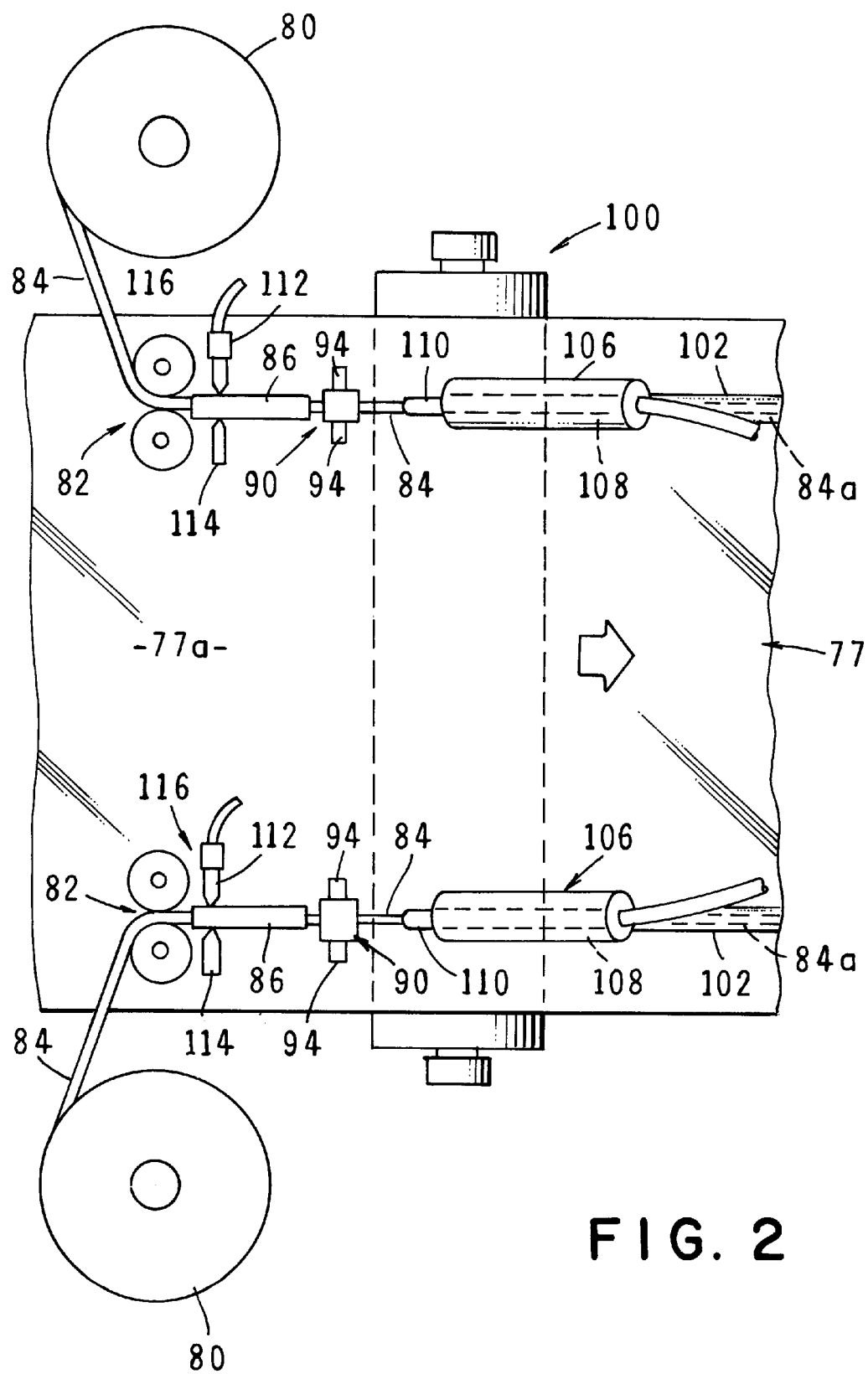
FIG. 2 is an enlarged fragmentary plan view of one form of the filament-feeding mechanism of the invention.

In another form of the invention, prior to being affixed to the laminate composite, the wires are cut into discrete lengths by cutting means which are mounted adjacent guide tubes 86. As best seen in FIG. 2, the cutting means here comprises a pair of opposing cutters 112 and 114 which extend through opposing apertures provided in guide tube 86. Cutter 112 is of a conventional construction and is connected to a piston which reciprocates within a hydraulic cylinder of a conventional hydraulically operated unit 116 which is of the character described in greater detail in incorporated by reference application Ser. No. 08/577,770. During the wire-cutting operation, hydraulic fluid, which is introduced into the hydraulic cylinder forces the piston inwardly causing the cutting extremity of cutter 112 to move into engagement with the wire 84 and, in cooperation with fixed cutter 114, clearly cuts the wire at predetermined locations. Additionally, the wire can be cut using rotary knives, the construction and operation of which is well known in the art. Further, cutters 112 and 114 can be operated by electrically operated solenoids.

When the cutting means of the apparatus of the invention is used, the cutting operation is carefully sequenced so that discrete segments of wire of precise length will be fed sequentially toward the upper surface of the laminate composite for encapsulation at predetermined, longitudinally, spaced-apart locations. More particularly, the placement of the discrete wire segments on the laminate composite is carefully timed so that the assemblage will be formed evenly with spaced-apart transverse bands that have no wires extending therethrough. During construction of the closable containers of the invention from such a laminate composite, which construction is more fully described in incorporated by reference Ser. No. 08/577,770, the laminate is carefully cut at the location of these bands. The section of laminate is then folded and sealed at the top and bottom portions thereof through which the wires do not extend.

Following securement of either the continuous length of wire or the wire segments to surface 77a of the laminate composite the assemblage thus formed is moved about roller 101 and then about spaced apart rollers 103 which comprise a part of the fifth means of the invention for continuously moving the second composite away from the bonding location. Next, the second composite is controllably rolled about a shipping roller 120 (FIG. 1A) which comprises a part of the sixth means of the invention for rolling the composite about the shipping roller. Shipping roller 120 is rotatably supported by a third support means which is mounted on a base assembly 122 which forms a part of support frame 47. The rolled assemblage can then be transferred to the location wherein the reclosable containers are to be produced in the manner discussed in detail in incorporated by reference application Ser. No. 08/577,778.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for making a laminate composite from a first thin film and a filament of substantially inelastic, malleable material connected thereto, said first thin film being initially rolled on a first roll, said apparatus including a support frame and comprising:

(a) first support means connected to said support frame for rotatably supporting the first roll;

(b) first means mounted on said support frame for continuously removing the first thin film from the first roll and for moving it in a longitudinal direction away from said first supporting means;

(c) feed means mounted on said support frame for continuously depositing a filament of substantially inelastic, malleable material onto said first thin film as said first thin film moves away from said supporting means;

(d) means mounted on said support frame for affixing the filament to said thin film to form a composite, said means comprising bead applying means for simultaneously depositing a bead of elastomeric material onto the filament and onto said first thin film; and (e) cutter means mounted on said support frame for cutting the filament of substantially inelastic malleable material into discrete segments prior to depositing the filament onto said first thin film composite.

2. An apparatus as defined in claim 1 in which said fourth means comprises filament adhesive applying means for applying an adhesive onto the filament.

3. An apparatus as defined in claim 1 further including a support means connected to said frame for rotatably supporting a shipping roller and means mounted on said frame for rolling said composite onto said shipping roller.

* * * * *